United States Patent [19]
Licata

[11] 3,760,755
[45] Sept. 25, 1973

[54] GUIDANCE SYSTEM FOR STRAIGHT RUNNING VEHICLES

[75] Inventor: William H. Licata, Adelphi, Md.

[73] Assignee: The United States of America as represented by the Secretary of the Navy, Washington, D.C.

[22] Filed: Sept. 20, 1971

[21] Appl. No.: 181,670

[52] U.S. Cl............ 114/23, 114/144 R, 244/3.15
[51] Int. Cl................ F42B 19/00, F42b 15/02
[58] Field of Search............ 114/20 R, 21 R, 21 W, 114/21 A, 23, 24, 25, 144; 244/3.15, 3.2, 3.21, 77 R; 102/DIG. 3; 318/588, 589

[56] References Cited
UNITED STATES PATENTS

| | | | |
|---|---|---|---|
| 3,053,486 | 9/1962 | Auld | 244/77 |
| 3,083,666 | 4/1963 | Agins | 114/24 X |
| 3,604,907 | 9/1971 | Wesner | 114/144 |

*Primary Examiner*—Benjamin A. Borchelt
*Assistant Examiner*—James M. Hanley
*Attorney*—R. S. Sciascia et al.

[57] ABSTRACT

A guidance system for heading control of a straight running vehicle, such as a torpedo, using a rate gyro with integrator and logic circuitry which measures the rate of angular deviation from course and which returns the vehicle to the previous intended track.

5 Claims, 1 Drawing Figure

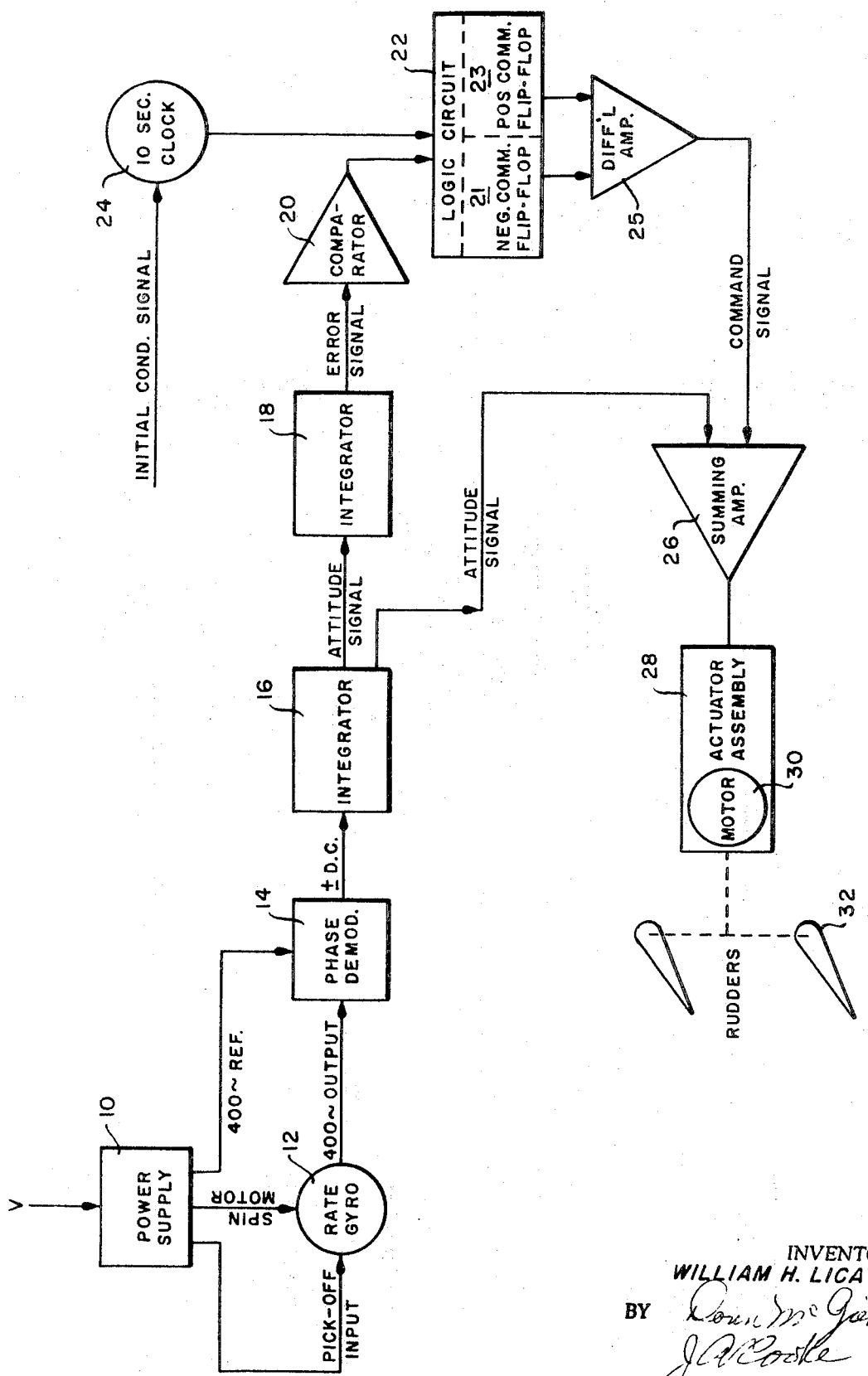

GUIDANCE SYSTEM FOR STRAIGHT RUNNING VEHICLES

BACKGROUND OF THE INVENTION

This invention relates generally to vehicle guidance systems and more particularly to the guidance control of straight running vehicles, such as a torpedo, using a rate gyroscope, integrator, and logic circuitry to measure the rate of angular deviation from course and to return the vehicle to the same course and track.

Typical vehicle guidance systems in the past have generally used free gyroscope systems to measure the angular deviation from the intended course and are capable only of returning this vehicle to a course parallel to the intended track but not to the same track. There obvious disadvantage is that the vehicle may deviate in angle from the intended track for a considerable length of time in the presence of a disturbance. Also, the vehicle will not return to the original track but rather to a parallel path. Therefore, the target may be missed. Free gyroscopes are subject to drift with time and require caging (locking in position while not in use) and are generally larger than rate gyros. Further, it is known that free gyros will not detect motion below a certain rate, that is they are less sensitive than rate gyros. Most free gyro specifications do not state a tolerance on this parameter. Furthermore, free gyros are considerably more expensive than rate gyros and this factor is significant when it is considered that they are expendable in a vehicle such as a torpedo or the like.

SUMMARY OF THE INVENTION

Accordingly, an object of the present invention is to provide a vehicle guidance system having a high degree of accuracy.

Another object of the instant invention is to provide a vehicle guidance system to maintain the vehicle on an intended track or return it accurately thereto.

A further object of the invention is to provide a vehicle guidance system having a low cost and high reliability.

Briefly, these and other objects of the present invention are attained by the use of a vehicle mounted rate-of-turn sensitive gyroscope, an integrator coupled to the output of the gyro, and a logic circuit coupled to the integrator all in a loop circuit of measuring the deviation from the set course and thereby controlling the rudder angle of the vehicle.

A type of inertial sensor used in this guidance system is an a.c. rate gyro capable of detecting even very slow rates-of-turn. The rate gyro output is demodulated and then integrated to produce an output indicative of the angular deviation from the intended path of the vehicle; or in other words, vehicle attitude compared to initial attitude. The basic feedback loop including the rate gyro and the integrator circuit attempts to keep the vehicle on the intended track or at zero deviation therefrom. Any outside disturbance applied to the vehicle is sensed by the rate gyro, and the first integrator output will then change to drive the rudders through an actuator assembly to correct any deviation from path, or in other words will zero the attitude angle. Accumulated cross range errors, proportional to the integral of the vehicle to its intended path, are corrected by a second integrator circuit.

Coupled to the second integrator is a logic circuit which samples the output every ten seconds to determine the polarity of the error signal. The logic circuit then commands the actuator assembly and the rudders to produce a right or left command to thus drive the error signal to zero again. When the error signal crosses through zero, the command signal automatically resets to zero.

A more complete understanding of the invention and many of the attendant advantages thereof will be readily appreciated as the same becomes better understood by reference to the following detailed description when considered in connection with the accompanying drawings wherein the sole FIGURE is a block diagram of the guidance system of the present invention.

DESCRIPTION OF THE PREFERRED EMBODIMENT

Referring now to the drawings, the FIGURE shows the complete guidance system including a power supply 10 powered by a source of Voltage, which produces an a.c. output which may be 400 cycle a.c. This a.c. voltage is applied to rate gyro 12 to operate its spin motor and to provide an a.c. signal to the pick-off input. The output of the rate gyro 12 is a 400 cycle signal varying in magnitude and phase and is fed to a phase sensitive demodulator 14. The phase demodulator 14 is also supplied with a 400 cycle reference signal from the power supply 10 for comparison with the rate gyro output for providing a positive or negative d.c. signal representative of rate-of-turn to a first integrator 16.

The first integrator 16 converts the rate-of-turn signal to an angle-of-turn or attitude signal and feeds it to a second integrator 18 which may be considered a deviation error accumulator. The accumulated error signal is supplied to a comparator 20 which produces either a zero potential signal or a discrete positive signal. The output of the comparator 20 is injected into a logic circuit 22 which is controlled in its operation by a ten second clock 24 started by an initial condition signal when the vehicle is launched. More particularly, logic circuit 22 comprises a negative command flip-flop 21 and a positive command flip-flop 23. Command signals from flip-flops 21 and 23 are separately fed to a differential amplifier 25. The output of differential amplifier 25 is supplied to a summing amplifier 26 which receives these amplified command signals and also an attitude signal from the first integrator 16 and combines them to produce a signal representative of the correction to attitude and trend of the vehicle necessary to put it back on the intended rack. An actuator assembly 28 receives the signal from the summing amplifier 26 to actuate a motor 30 and thence rudders 32 mechanically connected thereto.

In further explanation of the operation of this guidance system, the power supply 10 is connected to a source of direct current and inverts it to an alternating current voltage of 400 cycles for example. The 400 cycle output is fed to the rate gyro 12 where it is used to power the spin motor and is used as a pick-off input. The rate gyro produces a 400 cycle output signal varying in magnitude and phase and is fed to the phase demodulator 14. A 400 cycle reference signal nonvarying in magnitude and phase is also fed to the phase demodulator from the 400 cycle power supply. The demodulated signal of the phase sensitive demodulator is a direct current signal varying in magnitude and polarity, and is representative of the rate-of-turn and direction of turn of the vehicle as detected by the rate gyro.

This d.c. signal is integrated in the first integrator 16 to produce an attitude deviation signal which in reality represents the angle-of-turn made by the vehicle. This attitude signal is fed to the second integrator 18 which accumulates the errors of angular deviation from the intended track of the vehicle. This accumulated error signal is coupled to the comparator 20 which produces a discrete magnitude positive output signal to indicate that the second integrator is negative, and a zero potential to indicate that the second integrator is positive. The output of the comparator 20 is injected into the logic circuit 22. If the output of the second integrator 18 is negative, (comparator producing a positive signal) the positive command flip-flop 23 produces an output to the differential amplifier 25. On the other hand, if the output from the second integrator 18 is positive, (comparator producing a zero signal) the negative command flip-flop 21 produces an output to the differential amplifier 25. No output from the logic circuit occurs until a pulse is received from the ten second clock 24. The logic circuit 22 cannot be "set" by only "reset" to off when the clock is not producing pulses between the intervals of ten seconds.

In summary, if the output from the second integrator is positive, the logic circuit will give a negative rudder command signal when the clock pulses and returns to a zero command when the second integrator goes negative. If the output of the second integrator is negative, the logic circuit will give a positive rudder command signal when the clock pulses and returns to a zero command when the second integrator goes positive. These command signals may be adjusted to produce a 2° change in vehicle attitude, and are directed to the summing amplifier 26.

The summing amplifier 26 also receives the infinitely varying magnitude attitude signal directly from the first integrator 16 and combines it with the command signals from the logic circuit. The combined signal, representing the correction necessary to return the vehicle to the intended track, is fed to the actuator assembly 28 which drives the motor 30 either left or right to thus pivot the rudders 32.

As an example, when the vehicle is on track and on course, and the rate gyro 12 senses no turn, there is not attitude signal output from the first integrator 16, and the rudders are neutralized. Now assume a deviation to the left produces a positive signal output from integrator 16 to produce a turn to the right. If a disturbance in the vehicle's medium pushes the vehicle's nose to the left, the gyro senses a rate of turn to the left and the first integrator 16 puts out a positive signal to the summing amplifier 26 which causes a rudder deflection tending to bring the vehicle on course. The same signal is fed to the second integrator 18 where it is stored until the ten second clock activates the logic circuit 22. If the attitude signal to the summing amplifier is sufficient to put the vehicle back on track and course before the clock pulses, the corrective right turn of the vehicle causes a negative output to the second integrator 18 cancelling the positive error signal and hence there will be no command signal from the logic circuit when the clock does pulse. The rate gyro immediately senses the reduction of the rate of turn, and then the right corrective turn thus producing a lesser positive signal and then a negative signal from the first integrator to the summing amplifier to ease the vehicle back on course. If the attitude signal to the summing amplifier is not sufficient as above, when the clock pulses, there will be an accumulated error signal in the second integrator and thus the logic circuit produces a positive signal to be added with the positive attitude signal in the summing amplifier. Here, as soon as the vehicle responds and the second integrator starts to go negative, the logic circuit returns to zero, thus removing the command signal. Of course, as the vehicle responds, the rate gyro senses the reduction of rate of turn and then the corrective turn to the right, and the first integrator starts feeding a lesser positive signal and then a negative signal to the summing amplifier calling for a left turn to ease the vehicle back on course and track. It should be noted that the attitude signal is infinitely variable depending on the rate of turn and can produce a turn smaller or larger than the discrete command signal to give a damping effect when the vehicle returns to the track and course.

It will be apparent that the operation of the apparatus of the herein-described invention achieves vehicle attitude control using rate gyro, integrator, and logic circuitry for the steering control of straight running vehicles. It will also be apparent that, although the invention has been described in connection with the operation of a straight running vehicle, such as a torpedo, that it is not so limited and is equally applicable to a midcourse guidance system for a small homing type missile.

Obviously, numerous modifications and variations of the present invention are possible in the light of the above teachings. It is therefore to be understood that within the scope of the appended claims the invention may be practiced otherwise than as specifically described herein.

What is claimed as new and desired to be secured by Letters Patent of the United States is:

1. A guidance system for straight running vehicles having a steering mechanism comprising:
   a rate gyroscope means adapted to be mounted in a vehicle and responsive to the rate of angular deviation from the intended track of the vehicle;
   a first integrator circuit coupled to the output of said rate gyro for producing an attitude error signal representing the angular deviation from the intended track;
   a second integrator coupled to said first integrator for accumulating the angular deviation error signal therefrom;
   a logic circuit coupled to the output of said second integrator for producing discrete steering command electrical signals; and
   an actuator assembly coupled to said logic circuit and to said first integrator circuit producing signals to affect a change in angle of the steering mechanism.

2. The guidance system of claim 1 wherein said rate gyroscope means further comprises:
   a phase demodulator electrically connected between said rate gyroscope means and said first integrator for providing to said first integrator a direct current signal representing the rate-of-angular deviation.

3. The guidance system of claim 2 further comprising:
   a clock circuit coupled to said logic circuit to provide triggering pulses thereto for initiating output therefrom of steering command electrical signals.

4. The guidance system of claim 3 further comprising:

a summing amplifier electrically interposed between said actuator assembly and both said logic circuit and said first integrator for combining the attitude signal and the steering command electrical signals to said actuator assembly.

5. The guidance system of claim 4 further comprising:
a power supply coupled to said rate gyroscope for producing spin therein and a pick-off input.

* * * * *